Nov. 30, 1937.    J. S. PECKER    2,100,669
CENTRIFUGAL SEPARATING MACHINE AND METHOD OF TREATING SLUDGES
Filed March 9, 1934    2 Sheets—Sheet 1

INVENTOR
Joseph S. Pecker
BY
ATTORNEY

Nov. 30, 1937.  J. S. PECKER  2,100,669
CENTRIFUGAL SEPARATING MACHINE AND METHOD OF TREATING SLUDGES
Filed March 9, 1934  2 Sheets—Sheet 2

INVENTOR
Joseph S. Pecker
BY
ATTORNEY

Patented Nov. 30, 1937

2,100,669

UNITED STATES PATENT OFFICE 2,100,669

CENTRIFUGAL SEPARATING MACHINE AND METHOD OF TREATING SLUDGES

Joseph S. Pecker, Philadelphia, Pa., assignor to American Centrifugal Corporation, New York, N. Y., a corporation of Delaware Application March 9, 1934, Serial No. 714,850

13 Claims. (Cl. 210—63)

The invention relates to an automatic centrifugal machine and a method of treating sludges of various kinds for separating liquids from solids by centrifugal action and is a modification of the invention shown, described and claimed in a copending application filed by me on or about the 21st day of February, 1934, Serial No. 712,390.

The automatic centrifugal separating machine of the present invention is of the same general construction as that shown and described in the aforesaid application, and the object of the present invention is to provide simple, practical and efficient vacuum means for removing from the centrifugal rotary basket the light liquids and greases collecting or forming on the inner side of the sludge cake and to associate with the vacuum means a means for cutting out the dewatered sludge and for causing the same to be drawn by the vacuum means out of the basket for disposal as desired.

Another object of the invention resides in the provision of a centrifugal separating machine including a rotary centrifugal basket provided with seepage means at the top thereof so that when the basket is rotated at a high speed, liquids are separated from solids and simultaneously with the discharge of liquids through the seepage means, a wall of solids is compacted against the inner face of the side wall of the basket. The pressure within the basket incident to the centrifugal action, causes the formation of a compact cake of solids and a forcing of light liquids, greases and the like toward the inner surface of said cake. These light liquids, greases and the like are drawn out of the basket from the inner side of the cake after the formation of the latter and at a lower speed of rotation of the basket by a vacuum or suction means. The wall of solids is then reduced by an element of the vacuum means into particles under the lower speed of rotation of the basket and drawn from the basket over the same path of movement over which the light liquids, greases and the like had previously passed during rotation of the basket.

It is also an object of the invention to provide the vacuum means with a suction pump constituting a unit of the separating machine and mounted on the base of the same and driven by the actuating means for rotating the centrifugal basket but also adapted to be operated from any suitable source of power.

Another object of the invention is to provide a scraper operating within the rotary centrifugal basket and movable into the path of the dewatered sludge for cutting the same from the basket and provided with an interior passage adapted to receive the cut sludge and also connected with the vacuum means for enabling the cut sludge and the light liquids and greases collecting or forming at the inner face of the sludge cake to be removed from the machine by the vacuum means.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:—

Figure 1:
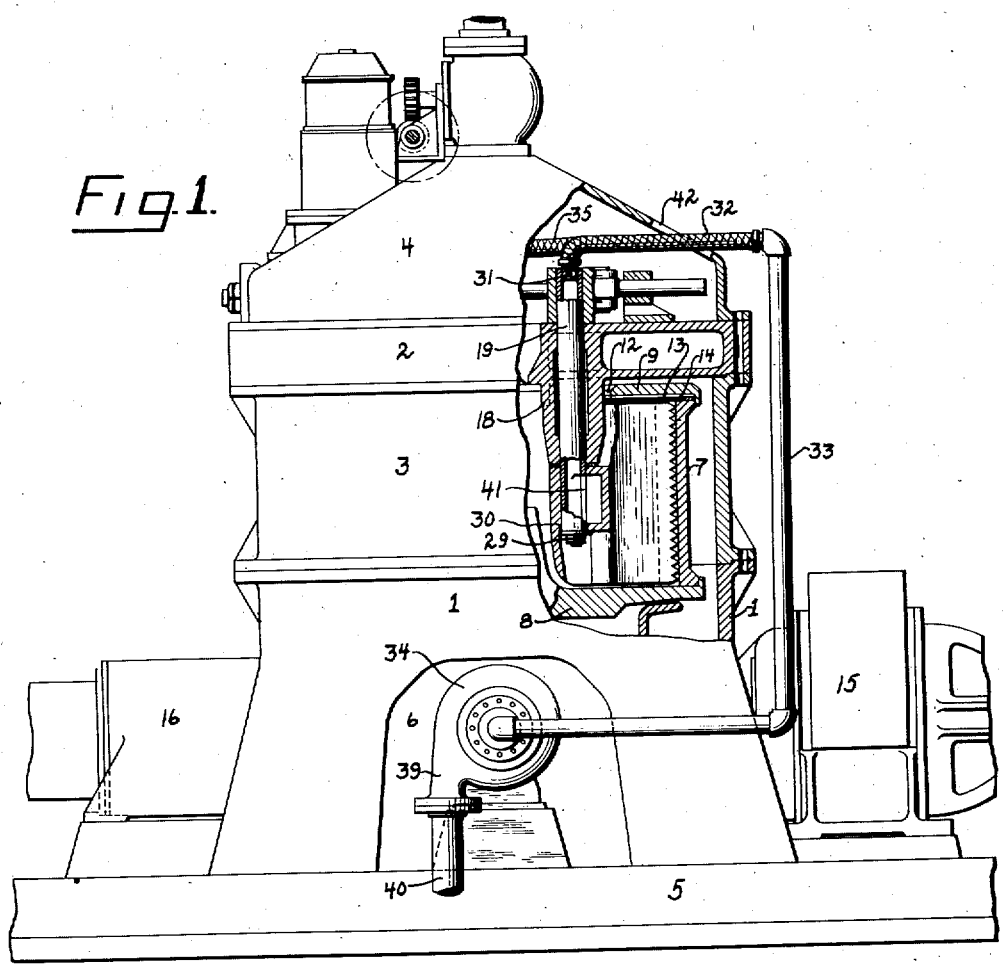
Figure 1 is an elevation partly in section of a continuous automatic centrifugal separating machine equipped with vacuum means constructed in accordance with this invention.

In the accompanying drawings in which is illustrated the preferred embodiment of the invention the centrifugal separating machine comprises in its construction a casing constructed substantially the same as that shown and described in the aforesaid application and comprising a lower section 1, upper and lower intermediate sections 2 and 3 and a top section 4 designed to be secured together by upper and lower vertical bolts as shown and described in the aforesaid application, in the present case the bolts being omitted for convenience of illustration. As in the said application the top section and the intermediate section are removable to permit the removal of a feeding unit and a basket unit as fully described and shown in the said application.

The bottom section 1 is provided with an integral base 5 preferably cast integral with the bottom section and of the form shown and described in the said application. The said base 5 forms an interior space 6 and is designed to be arranged over a pit into which material may be discharged when it is discharged from a centrifugal basket 7 but the material may be discharged into an incinerator or on to a conveyor or otherwise disposed of, as will be readily understood.

The centrifugal basket 7 which is constructed substantially the same as that shown and described in the said application, consists of a vertical cylindrical body portion, a circular bottom plate 8 and an annular top plate 9, the top and bottom plate being in practice bolted to the body portion but the bolts being omitted in the present case for convenience.

The cylindrical body portion of the centrifugal basket 7 forms imperforate vertical walls or sides and the bottom plate which has a horizontal upper face is provided with a central hub 10 and has a plurality of radial openings 11 surrounding the hub for enabling any material remaining in the basket to be pushed through the bottom of the basket, and which openings 11 are an aid to the vacuum means hereinafter described for removing out sludge from the basket.

The annular top plate 9 provides a central opening 12 in the top of the centrifugal basket and it is provided in its lower face with radial seepage channels 13 which are covered by a screen or seepage plate 14 interposed between the top plate 9 and the body portion of the centrifugal basket and securely clamped between the same. The seepage means is of the same construction as that shown and described in the said application. As the liquids are separated from the solids the solids are thrown by centrifugal force against the imperforate side walls of the basket, forming a built up wall of solids or a cake thereof against the imperforate side walls of the basket while the liquids and greases separated from the solids pass through or are forced through the seepage means at one end of the basket and discharged from the machine. The seepage means is clearly illustrated in the drawings, including channels 13 open at both ends and extending from the central portion of the annular top plate 9 of the basket to the periphery of the basket and which channels have communication with the interior of the basket through the seepage openings in the seepage plate 14, all as illustrated and described in the aforesaid application Serial No. 712,390.

The seepage means provides for a continuous discharge of separated liquids and greases during the entire impacting of the solids wall or cake against the side walls of the basket during the separation process. Incident to pressures in the basket, due to centrifugal action, liquids and moisture in the cake or wall of solids between the inner and outer surfaces thereof likewise pass from the interior of the compacted cake or wall of solids through the seepage openings in the annular top plate 9 and into the channels 13 all as described in the aforesaid application Serial No. 712,390, further reducing the moisture content of the wall or cake of solids.

It is obvious that when all or substantially all of the separated liquids have been discharged from the basket through the seepage means that continued rotation of the basket at high speed and due to centrifugal action, and incident to pressures in the basket due to centrifugal action, the cake or wall of solids is further compacted or compressed with the result that moisture within the interior of the cake or wall of solids incident to centrifugal action and pressures is expelled from the cake or wall of solids through the seepage means. By virtue of the imperforate side walls of the basket and one end of the solids wall lying or resting on an imperforate portion of a respective end of the basket, moisture within the interior of the cake or wall of solids is constrained under the centrifugal forces and pressures to leave the cake or wall of solids at the opposite end of the basket, that is, at the end at which the seepage means is located.

When all or substantially all of the separated liquids and greases have been discharged from the basket through the seepage means the speed of rotation of the basket is reduced and the basket rotated under the influence of the low speed motor. When changing from high speed to low speed, that is, at the conclusion of the separation process, a certain amount of liquid and greases may remain in the basket and be carried around by capillary action with the solids wall or cake and at such time, incident to centrifugal forces, light liquids, greases and the like may be forced to the exposed inner surface of the solids wall or cake. Under the low speed operation of the basket any liquids and greases not expelled through the seepage means during the separation process as well as any liquids, greases or the like adhering to the exposed surface of the solids wall or cake are preferably removed or taken by the vacuum or suction means from the basket and the solids wall or cake prior to reducing the latter into small particles as will be understood by further reading of the specification. Further illustration and description thereof are deemed unnecessary in the present application. The centrifugal basket is designed to be rotated at a high purging speed by a high speed motor 15 and at a low cleaning speed by a low speed motor 16 and as the means for mounting the rotary centrifugal basket and the means for connecting the same with the high and low speed motors are the same as illustrated and described in the said copending application, detail illustration and description of such means are deemed unnecessary in the present application particularly as any suitable means may be employed for mounting the rotary basket and for rotating the same for purging and for cleaning purposes.

Figure 2:
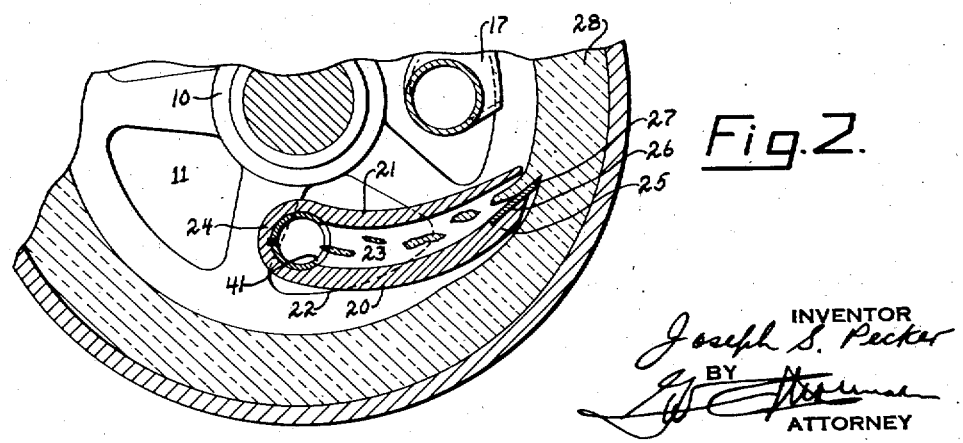
Fig. 2 is an enlarged detail horizontal sectional view of a portion of the rotary centrifugal basket, showing one of the hollow scrapers provided with an interior passage for the cut material and also for the light liquids and greases whereby the cut sludge and the liquids are drawn off by the vacuum means.
Figure 3:
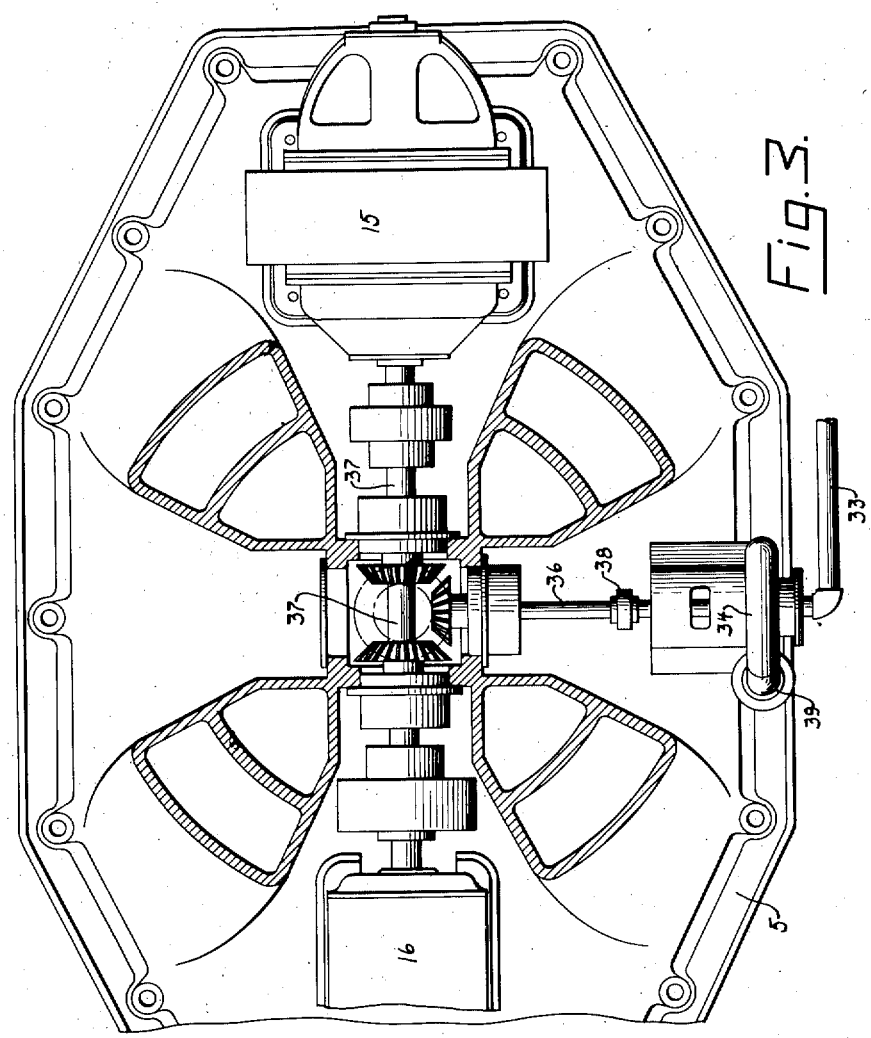
Fig. 3 is a horizontal sectional view illustrating the mechanism for driving the suction pump and for connecting the same with the gearing which rotates the centrifugal basket.

The sewage or other material to be dewatered is fed to the centrifugal machine through feeding mechanism similar to that shown and described in the said application, one of the branches 17 being illustrated in Fig. 2 of the drawings, it being understood that the machine will be provided with the feeding mechanism shown, described and operated as explained in the said copending application, but any other suitable means may, of course, be employed for feeding the material to the centrifugal basket and that the feeding means will be operated and controlled as explained in the said application.

The intermediate supporting member 2 which is of substantially the same construction as that shown and described in the aforesaid application is provided at opposite sides of the center with vertical hubs 18, one hub 18 only being shown in the drawing for convenience of illustration. The hub 18 depends from the supporting member and extends into the upper portion of the centrifugal basket and has mounted within it a hollow vertical shaft 19 extending through the hub and projecting above and below the same, as clearly illustrated in Fig. 1 of the drawings. Mounted upon the hollow vertical shafts are hollow curved scrapers 20 tapered outwardly from the shafts. The hollow scraper is composed of curved front and rear walls 21 and 22 spaced apart to provide an intervening passage 23 which is open at the outer end of the hollow scraper. The hollow scraper is provided at its inner end with a curved connecting portion 24 forming a sleeve which is arranged on and keyed or otherwise fixed to the hollow shaft 19.

Figure 4:
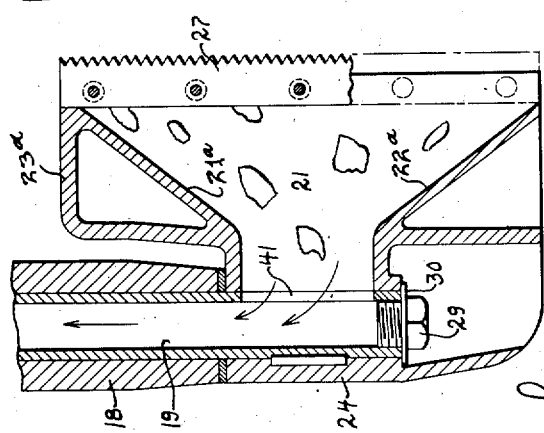
Fig. 4 is an enlarged detail vertical sectional view of one of the hollow scrapers and a portion of the hollow vertical shaft on which it is mounted and illustrating the passage of the cut sludge through the hollow scraper and into the hollow vertical shaft.

The inner connecting end portion 24 is reduced in height and terminates short of both the top and bottom of the curved scraper, as clearly illustrated in Figs. 1 and 4 of the drawings. The front and rear walls 21 and 22 of the hollow scraper are also connected by inwardly converging inclined integral top and bottom walls 21a and 22a forming with the front and rear walls 21 and 22 a hollow housing and providing a flaring or tapering passage 23 for directing and conducting all of the sludge cut from the basket to and into the passage formed by the hollow shaft 19. The mouth or entrance of the passage 23 extends from the top to the bottom of the centrifugal basket so that practically all of the sludge cut from the basket by the scraper is removed by the vacuum means. The top of the scraper is preferably completely closed by a horizontal wall or web 23a to avoid the formation of a pocket into which material might collect. As illustrated in Figs. 2 and 4 of the drawings cut sludge from all directions will be drawn into the tapering passage of the hollow scraper.

The rear wall 22 of the scraper which is preferably of greater thickness than the front wall 21 has a beveled outer edge 25 and its inner or front face is recessed at 26 adjacent to the beveled edge to receive a toothed cutting blade 27. The toothed cutting blade 27 projects beyond the outer edge of the rear wall 22 and is adapted to cut the sludge cake 28 collecting on the inner face of the imperforate vertical wall formed by the body portion of the centrifugal basket 7, as clearly shown in Fig. 2 of the drawings.

The cut material as indicated in Fig. 2 of the drawings passes inwardly through the passage or space 23, the inward or converging movement of the cut sludge towards the center of the machine being caused by the mechanical structure of the curved scraper and also assisted by the suction action of the vacuum means so that the cut material will be positively moved inwardly towards the central portion of the basket and caused to be drawn upward through the passage in the hollow shaft 19. The toothed cutter blade 27 by being mounted on the outer portion of the rear wall of the curved cutter feeds the cut material into the curved passage or space 23 so that there is a positive feeding action of the cut material through the said passage or space 23 to the suction means.

The inner or front face of the rear wall 22 of the scraper is concave and the rear face of the same is convex. The front wall 21 of the scraper is correspondingly curved and converges slightly towards the rear wall, thereby providing a tapering passage or space which gradually increases in width from the outer edges of the scraper to the inner portion of the same.

The hollow vertical shaft 19 on which the curved scraper is mounted extends to the bottom of the inner connecting or sleeve portion 24 and has its lower end closed by a screw plug 29, a washer 30 being arranged on the screw plug to form a flange for engaging the scraper at the bottom of the inner connecting or sleeve portion 24 but the engaging flange may be formed in any other desired manner, as will be readily understood, and any other suitable means may be provided for closing the lower end of the hollow shaft and for securing the scraper rigidly to the same. The hollow shaft forms a portion of the suction line of the vacuum means for removing liquids and greases and cut sludge from the centrifugal basket and the upper end of the hollow vertical shaft 19 receives a threaded nipple 31 to which is suitably secured the inner end of a flexible branch pipe 32 which connects the upper end of the hollow shaft with a suction pipe 33 arranged exteriorly of the casing of the machine and extending from a suction pump 34 to the upper portion of the casing. Two flexible branch pipes 32 and 35 are shown in Fig. 1 of the drawings, the flexible branch pipe 35 being designed to extend to the scraper at the left hand side of the machine, only the scraper at the right hand side of the center of the machine being illustrated in Fig. 1 of the drawings for convenience as a description and illustration of one of the scrapers and the vacuum means for connecting the same with the suction pump 34 is deemed sufficient as both scrapers are of the same construction and a description of one will suffice for a description of the other.

The suction pipe 33 preferably consists of a lower horizontal portion and a vertical riser portion as illustrated in Fig. 1 of the drawings, but it may be arranged in any other convenient manner. The high and low speed motors 15 and 16 are mounted on the base 5 of the casing and are arranged diametrically opposite each other as shown and described in the aforesaid copending application and the vacuum or suction pump 34 is mounted on the base with its shaft 36 disposed horizontally and arranged at right angles to the horizontal motor driven shaft 37 which is associated with the high and low speed motors and which is connected with the rotary centrifugal basket as set forth in the said copending application. The horizontal shaft 36 of the suction pump 34 is designed to be provided with a suitable coupling clutch 38 to enable it to be disconnected from the mechanism for rotating the centrifugal basket when desired. Any suitable clutch or coupling connection may, of course, be employed, and a description of the specific construction of the same is deemed unnecessary. The suction pump 34 is provided with a suitable outlet 39 which is connected with a discharge pipe 40 designed to extend to any suitable point for the disposal of the liquids and greases and cut sludge removed from the centrifugal basket by the vacuum means. The lower end of the hollow vertical shaft is provided with a lateral opening 41 which communicates with the respective hollow shaft and the tapering space or passage formed by the walls 21 and 22 and 21a and 22a of the curved scraper.

This lateral opening connects the passage of the hollow vertical shaft with the passage of the hollow scraper so as to expose the interior of the hollow scraper to the action of the vacuum means. The top section of the casing is provided with an opening 42 for the passage of the flexible branches 32 and 35 of the suction line.

The operation of the centrifugal basket is substantially the same as that explained in the said copending application, the dewatered sludge collecting in a cake on the imperforate vertical walls of the centrifugal basket and liquids and greases passing outwardly through the seepage means at the top of the basket.

When the speed of the basket is reduced and the basket is rotated by the low speed motor the discharge of the separated liquids and greases through the seepage means of the basket ceases. At such time some liquids and greases may be retained in the basket and carried by capillary attraction around with the solids wall or cake and some light liquids, moisture or light greases may cling to or adhere to the inner exposed surface of the solids wall or cake. Therefore, before scraping or cutting into the solids wall or cake to reduce the same into particles for discharge from the basket the liquids and light greases remaining in the basket or adhering to the exposed surface of the solids wall or cake are removed therefrom by the vacuum means as the basket rotates under the influence of the low speed motor. As soon as the liquids and light greases are removed from the solids wall or cake the latter is reduced into particles and removed from the basket by the vacuum means over the same course or path of travel as that previously taken by the liquids and greases removed by said vacuum means and which is a course or path of travel different from that taken by the separated liquids and greases under the high speed operation of the basket in the first instance of separation as should now be well understood.

The rotary centrifugal basket is operated as explained in the aforesaid application at a high purging speed and at a low cleaning speed and the vacuum means may operate continuously or only during the high purging speed or only during the low cleaning speed as desired. When operated during the rotation of the centrifugal basket at the low cleaning speed the sludge is removed as the same is cut and fed inwardly by the scraper and caused to be drawn into the passage of the hollow shaft by the suction means.

What is claimed is:—

1. In combination with a centrifugal separating machine including a rotary centrifugal basket and means for rotating the basket to separate liquids from solids and build up a wall of solids in the basket, of a seepage means at the top of the basket including channels open at their inner and outer ends and having communication with the interior of the basket substantially throughout the lengths thereof for the continuous discharge of separated liquids through the channels during separation of the liquids from the solids incident to rotation of the basket, and a single means operatively connected with the machine and having communication with the interior of the basket for drawing liquids away from the inner surface of the built up wall of solids subsequent to the aforesaid separation of liquids from solids and also operable for withdrawing the solids from the basket subsequent to the separation of the liquids from the solids and discharge of the separated liquids from the basket.

2. In a centrifugal separating machine, a rotary centrifugal basket mounted to rotate on a vertical axis, seepage means at the top of the basket for the discharge of liquids from the basket including substantially radially disposed channels open at their inner and outer ends with the outer ends of the channels arranged to discharge the liquids beyond the side walls of the basket, the bottoms of the channels having communication with the interior of the basket, said communication means extending from the side walls of the basket inwardly to substantially the inner ends of the channels, means for rotating the basket at high speed for separating the liquids from the solids and build up a wall of solids against the side walls of the basket and continuously discharging liquids through said seepage means throughout the entire separating operation, means for rotating the basket at low speed, a hollow scraper having an opening at its outer side and operable for the positioning of its opening at the outer side thereof adjacent the wall of solids, a hollow shaft to which the scraper is secured and with which the scraper communicates at its inner side, and vacuum means having communication with the hollow shaft operable to draw particles of said wall of solids inwardly through said hollow scraper and through said hollow shaft out of the basket.

3. In a centrifugal separating machine, a rotary centrifugal basket, means for rotating the basket to separate heavy liquids from solids and discharge the liquids from the basket during said separation and simultaneously build up a wall of solids in the basket, seepage means at the top of the basket extending inwardly from the side walls of the basket a distance greater than the width of the wall of solids and leading from the interior of the basket, and vacuum means for removing light liquids and greases from the inner surface of the built up wall of solids and from the interior of the wall of solids subsequent to said separation of the heavy liquids from the solids and then operable for cutting the wall of solids into particles and for removing the particles of solids from the basket over the same path of exit previously taken by the light liquids and greases in their discharge from the basket.

4. In a centrifugal separating machine, a rotary centrifugal basket mounted to rotate on a vertical axis and having imperforate side walls, means for rotating the basket to separate the liquids from solids and build up a wall of solids against the side walls of the basket, seepage means at the top of the basket arranged to permit the continuous discharge of the separated liquids during the entire impacting operation in the building of the wall of solids against the side walls of the basket, a vertical hollow shaft extending into the basket, a hollow scraper movably mounted in the basket and in one position having coactive relation with the built up wall of solids for cutting away particles of the built up wall of solids, the scraper having communication with said hollow shaft, and means connected to and communicating with said hollow shaft for drawing said particles as they are cut inwardly into and through the hollow scraper and into and through said hollow shaft out of the basket.

5. In a centrifugal separating machine, a rotary centrifugal basket mounted to rotate on a vertical axis, means for rotating the basket to separate the liquids from the solids and discharge the separated liquids from the basket and build up a wall of solids against the side wall of the basket, a hollow scraper provided with a toothed cutting element and operating within the basket and provided with an opening adjacent the cutting element to receive particles of material as the material is cut from the built-up wall of solids for passage into the scraper, the outer side of the scraper being of a length substantially the same as the vertical dimension of the basket and the inner side of the scraper being of less length than the outer side thereof, and a hollow shaft having communication with the inner side of the scraper and secured thereto between the top and bottom thereof, and means operatively connected to the hollow shaft and communicating therewith for drawing particles of material through the scraper and through said hollow shaft out of the basket 6. In a centrifugal separating machine, a rotary centrifugal basket having imperforate side walls, an annular plate on the top of the basket including a central opening and having seepage openings extending inwardly from the side walls of the basket to substantially said central opening in the top plate, said basket being mounted to rotate on a vertical axis, means to rotate the basket at high speed to separate liquids from solids and by the centrifugal action discharge the separated liquids continuously from the basket through the seepage openings extending from the side wall of the basket to substantially said central opening in the top plate while building up a wall of solids against the side wall of the basket and during the entire impacting operation in the building up of said wall of solids, means operable subsequent to the separation of the liquids from the solids for cooperation with the inner surface of the built up wall of solids to remove light liquids and greases adhering thereto for removal of the same from the basket and subsequently by the same means removing particles of the material of the built up wall of solids from the side wall of the basket to unload the basket.

7. In a centrifugal separating machine, a rotary centrifugal basket mounted for movement on a vertical axis, and a pivoted scraper operating within the centrifugal basket and provided with sludge cutting means and movable into the path of sludge collected within the basket incident to centrifugal action for cutting the sludge therefrom, said scraper including front and rear walls spaced apart to form an intervening space for the passage of cut material, said material receiving space having inclined upper and lower walls to form a vertical taper and said space also being tapered and gradually increasing in width inwardly from the outer portion of the scraper, and means for drawing the material through the scraper out of the basket.

8. In a centrifugal separating machine, a casing, a rotary centrifugal basket mounted in the casing, means for rotating the basket to separate liquids from solids and discharge the liquids from the basket and build up a wall of solids in the basket, vacuum means for removing the wall of solids in small particles from the basket including a hollow scraper provided with an opening to receive such particles and also provided with a toothed element to facilitate extraction of the built-up wall of solids, a hollow shaft supported by the casing and to which the scraper is connected at the lower end thereof and which communicates with said shaft adjacent the lower end of the latter, a closure for the lower end of the shaft, and means operatively connected with the hollow shaft and communicating therewith to draw particles of the wall solids material through the scraper and through the hollow shaft out of the basket while the basket rotates.

9. In a centrifugal separating machine, a casing, a rotary centrifugal basket mounted in the casing on a vertical axis, means for rotating the basket at high speed to separate liquids from solids in the basket and discharge the separated liquids from the basket and build a wall of solids in the basket, vacuum means for gradually removing the wall of solids from the basket including a hollow shaft supported on the casing and extending a substantial degree into the basket, and a hollow scraper in the basket having an opening in the outer side thereof of a length substantially the length of said outer side and at its inner side connected to said hollow shaft and communicating therewith at a point within the basket, said hollow shaft having a removable closure at its lower end arranged within the area of the scraper, a pump having communicating connection with the hollow shaft, and means for operating the pump.

10. The method of treating sewage and similar materials in a centrifugal machine consisting in centrifuging the material to separate liquids from solids and compact the solids in a cake, discharging the separated liquids from the machine continuously while and during the entire compacting of the solids into the cake, and subsequent to the separation and discharge of the separated liquids removing light liquids, greases and the like from a surface portion of said cake and conveying same from the machine over a different path than that over which the first separated liquids were discharged and while the material is subjected to continued centrifugal action, and after discharge of the light liquids, greases and the like gradually reducing the cake of solids into particles.

11. The method of treating sewage and other materials which consists in centrifuging the material at a high speed to first simultaneously separate liquids and greases from the solids and build up a wall of solids, then reducing the speed of the centrifugal action and at the time of reduced speed sucking liquids and greases from a surface portion of the solids wall to further reduce the moisture content of the solids, and finally transferring the material composing the wall of solids from the centrifuging location.

12. In a centrifugal separating machine, a casing including a removable section having a depending hub, a rotary centrifugal basket mounted for rotation on a vertical axis and having an opening in the top thereof and through which opening and into the basket the said hub extends, means for rotating the basket to separate liquids from solids and build up a wall of solids in the basket incident to centrifugal force, a hollow shaft journalled in said hub and having substantial bearing in the latter throughout the greater portion of the length of the shaft, a hollow scraper in the basket secured to said shaft and communicating with the latter and having an opening at its outer side to receive sludge or similar material, a toothed scraping element secured to the scraper adjacent said scraper opening adapted to scrape material from the built-up wall of solids in the basket for passage into and through the scraper, and means operatively connected with said hollow shaft and communicating therewith to draw the particles of extracted solids into and through the scraper and into and through said hollow shaft out of the basket.

13. In a centrifugal separating machine, a rotary centrifugal basket having imperforate side walls, means for rotating the basket at high speed to separate liquids and greases from the solids, said basket being provided at the top with seepage means arranged to continuously discharge the liquids and greases from the basket and cause the basket at the same time to build up a wall of solids against the imperforate side walls of the basket, means for rotating the basket at a lower speed at the end of said separating operation, vacuum means including a device located in the basket and movable therein and having an opening communicating with the interior of the basket and also having communication with the vacuum means, a solids wall, reducing means carried by said device adjacent said opening of the latter, said device being movable to a position in the basket to present the said opening thereof adjacent the exposed inner surface of the solids wall to withdraw therefrom liquids and greases adjacent thereto through said device and the vacuum means, said device being then movable outwardly to gradually work said reducing means through the solids wall to reduce the latter into particles and to suck the particles into said device for withdrawal from the basket by said vacuum means.

JOSEPH S. PECKER.

CERTIFICATE OF CORRECTION.

Patent No. 2,100,669. November 30, 1937.

JOSEPH S. PECKER.

It is hereby certified that error appears in the printed specification of the above numbered patent requiring correction as follows: Page 2, second column, lines 38, 39 and 40, strike out the words and period "Further illustration and description thereof are deemed unnecessary in the present application.; and that the said Letters Patent should be read with this correction therein that the same may conform to the record of the case in the Patent Office.

Signed and sealed this 1st day of February, A. D. 1938.

(Seal)

Henry Van Arsdale,
Acting Commissioner of Patent side walls, means for rotating the basket at high speed to separate liquids and greases from the solids, said basket being provided at the top with seepage means arranged to continuously discharge the liquids and greases from the basket and cause the basket at the same time to build up a wall of solids against the imperforate side walls of the basket, means for rotating the basket at a lower speed at the end of said separating operation, vacuum means including a device located in the basket and movable therein and having an opening communicating with the interior of the basket and also having communication with the vacuum means, a solids wall, reducing means carried by said device adjacent said opening of the latter, said device being movable to a position in the basket to present the said opening thereof adjacent the exposed inner surface of the solids wall to withdraw therefrom liquids and greases adjacent thereto through said device and the vacuum means, said device being then movable outwardly to gradually work said reducing means through the solids wall to reduce the latter into particles and to suck the particles into said device for withdrawal from the basket by said vacuum means.

JOSEPH S. PECKER.

CERTIFICATE OF CORRECTION.

Patent No. 2,100,669. November 30, 1937.

JOSEPH S. PECKER.

It is hereby certified that error appears in the printed specification of the above numbered patent requiring correction as follows: Page 2, second column, lines 38, 39 and 40, strike out the words and period "Further illustration and description thereof are deemed unnecessary in the present application.; and that the said Letters Patent should be read with this correction therein that the same may conform to the record of the case in the Patent Office.

Signed and sealed this 1st day of February, A. D. 1938.

(Seal)

Henry Van Arsdale,
Acting Commissioner of Patent

CERTIFICATE OF CORRECTION.

Patent No. 2,100,669. November 30, 1937.

JOSEPH S. PECKER.

It is hereby certified that error appears in the printed specification of the above numbered patent requiring correction as follows: Page 2, second column, lines 38, 39 and 40, strike out the words and period "Further illustration and description thereof are deemed unnecessary in the present application."; and that the said Letters Patent should be read with this correction therein that the same may conform to the record of the case in the Patent Office.

Signed and sealed this 1st day of February, A. D. 1938.

(Seal)

Henry Van Arsdale,
Acting Commissioner of Patent